United States Patent [19]
Ellis et al.

[11] Patent Number: 5,949,631
[45] Date of Patent: Sep. 7, 1999

[54] SHIPPING CARTRIDGE FOR PROTECTING A DISK DRIVE

[75] Inventors: Carl E. Ellis, Layton; Lewis E. Farrer, Kaysville; Richard F. Leavitt, Layton, all of Utah

[73] Assignee: Iomega Corporation, Roy, Utah

[21] Appl. No.: 08/959,871

[22] Filed: Oct. 29, 1997

[51] Int. Cl.⁶ .......................... G11B 23/02; G11B 33/02; G11B 33/06; G11B 33/14
[52] U.S. Cl. .......................................................... 360/137
[58] Field of Search .................................. 360/137, 133, 360/128, 97.04

[56] References Cited

U.S. PATENT DOCUMENTS

| | | | |
|---|---|---|---|
| 5,122,918 | 6/1992 | Chao | 360/133 |
| 5,148,337 | 9/1992 | Cullen et al. | 360/97.04 |
| 5,268,809 | 12/1993 | Eschenburg | 360/137 |
| 5,367,423 | 11/1994 | Phillips | 360/137 |
| 5,546,257 | 8/1996 | Jennings | 360/128 |
| 5,650,891 | 7/1997 | Thayne et al. | 360/99.06 |
| 5,710,688 | 1/1998 | Cihak et al. | 360/137 |

*Primary Examiner*—William J. Klimowicz
*Attorney, Agent, or Firm*—Woodcock Washburn Kurtz Mackiewicz & Norris, LLP

[57] ABSTRACT

The invention relates to a shipping cartridge for inserting into a disk drive. This shipping cartridge can be inserted into the disk drive for protecting the disk drive during movement or handling of the disk drive. When inserted into the disk drive, the shipping cartridge transmits forces applied to the disk drive away from the relatively fragile components of the disk drive and towards the relatively sturdy components of the disk drive. In a preferred embodiment, the shipping cartridge transmits the load to the relatively sturdy chassis of the disk drive. The shipping cartridge may have a surface that generally conforms to the chassis of the disk drive so that the cartridge can rest on the chassis. For example, the shipping cartridge may have apertures that can receive protrusions extending from the chassis.

21 Claims, 3 Drawing Sheets

SHIPPING CARTRIDGE FOR PROTECTING A DISK DRIVE

BACKGROUND OF THE INVENTION

This invention relates to disk drives and more particularly to a shipping cartridge for inserting into a disk drive when it is moved and thereby preventing or minimizing the likelihood of damage to the disk drive from mechanical shock. The invention also relates to a method of packaging a disk drive with a shipping cartridge to protect it from damage from mechanical shock.

As is generally known, a computer disk drive has a plurality of components. Many of these components are relatively small. When a disk drive is moved, these components may be damaged by mechanical shock. For instance, disk drives may be damaged while being shipped from an original point of manufacture. Thus, there is a need to protect disk drives from damage when they are being shipped.

As disk drives become smaller and smaller in order to meet design constraints, the component parts of the disk drive become smaller. In some instances they become more fragile. As the fragility of the components of a disk drive increases, the concern with preventing damage during movement of the disk drives is further increased.

If the disk drive itself is to be incorporated into a larger assembly, for instance a laptop computer or another larger device, the casing of the disk drive may be less rigid than a casing used with a stand alone computer. In some instances, disk drives that are to be incorporated into another larger assembly, such as a lap top computer, may not have a casing. Furthermore, even if a disk drive is intended to be housed in a tray or a casing, the disk drive may be manufactured and shipped without a casing. This typically occurs when an original equipment manufacturer (OEM) handles the disk drives. Consequently, the likelihood of damage to disk drives that are moved without a casing is heightened.

This invention includes a shipping cartridge that can be used to prevent or minimize the likelihood of damage to a disk drive during handling or shipping prior to the disk drive being installed in a laptop computer, bay, tray, cashing or other device. This invention also includes a method of packaging a disk drive to prevent or minimize the likelihood of damage to a disk drive during handling or shipping of a disk drive.

SUMMARY OF THE INVENTION

The shipping cartridge of this invention can be received into a disk drive that has a chassis. The chassis of the disk drive is relatively sturdy. When inserted into the disk drive, the shipping cartridge functions to transmit static and dynamic loads to the relatively sturdy chassis. This shipping cartridge can be inserted into the disk drive before the disk drive is installed into a laptop computer, bay, tray, casing or other device to prevent or minimize the likelihood of damage to the disk drive and its components while it is being moved.

The chassis of the disk drive may have a lateral surface and a wall extending from each of its longitudinal sides. Extending from each wall approximately parallel to the lateral surface may be a top. A groove is formed between each wall, the lateral surface and the respective top. Preferably, the shipping cartridge is of a size such that when it is inserted into the disk drive, the peripheral longitudinal sides of the shipping cartridge are inserted in the grooves.

The shipping cartridge may also include a top surface, a bottom surface and a peripheral rail disposed on the bottom surface. The peripheral rail rests on the lateral surface of the chassis of the disk drive when inserted into the disk drive. The peripheral rail supports the shipping cartridge. Any force applied to the shipping cartridge is transmitted through the shipping cartridge to its peripheral rails and to the chassis. Preferably, the peripheral rail conforms to the surface of the chassis. For instance, if the chassis has a protrusion extending above its surface, the peripheral rail has a corresponding aperture to receive the protrusion.

The disk drive may have an eject button and a light pipe extending from the front of the disk drive. In order to protect these components, the shipping cartridge may extend over them when inserted into the disk drive. This helps to protect the eject button and the light pipe in the event a load is applied to them, such as if the disk drive is dropped.

According to one aspect of the invention, the shipping cartridge has tabs extending from its top surface. These tabs rest against the front of the chassis and thereby transmit any force applied to the disk drive to the relatively sturdy walls of the chassis, as opposed to the more fragile disk drive components.

The disk drive may have a top. This top may be constructed from a relatively flexible material, such as sheet metal. When inserted into the disk drive, the shipping cartridge can support the top of the disk drive. By supporting the top of the disk drive, the shipping cartridge prevents or minimizes the likelihood that the top will be damaged.

Other features of this invention are described below.

DETAILED DESCRIPTION OF THE PREFERRED EMBODIMENTS

Figure 1:
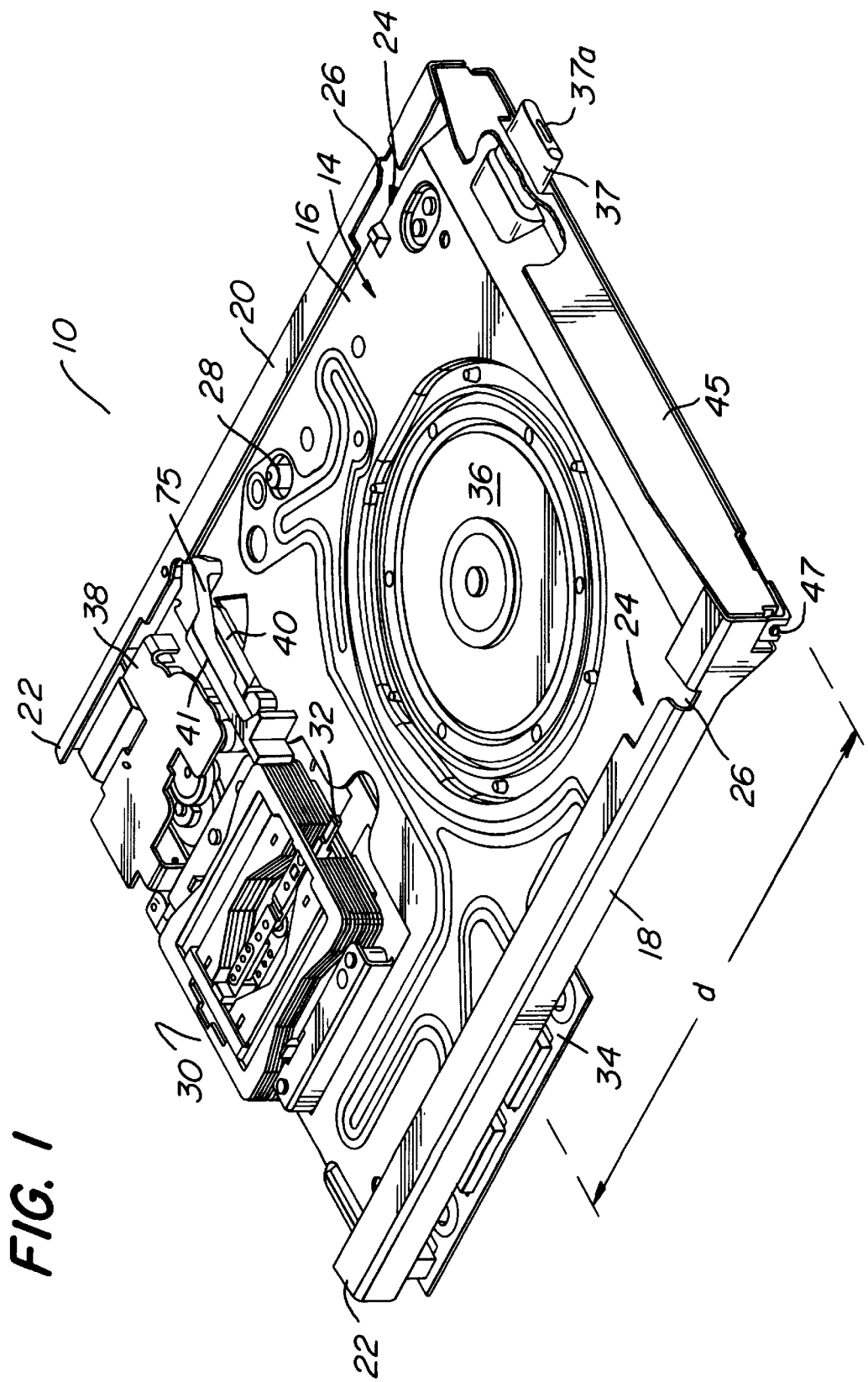
FIG. 1 is an isometric view of a disk drive in which the shipping cartridge of FIGS. 2 and 3 can be used.
Figure 2:
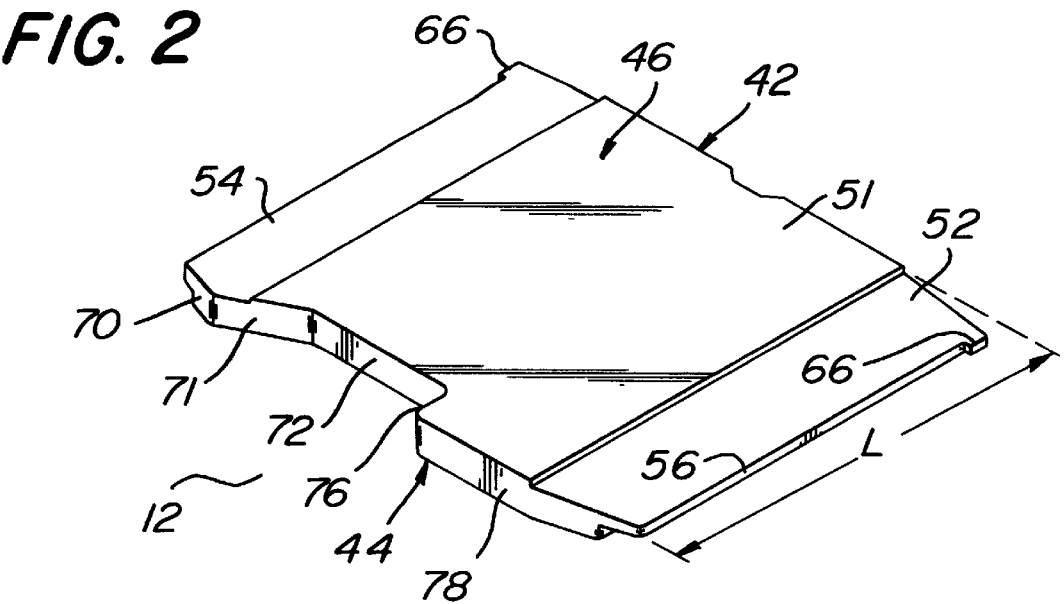
FIG. 2 is a top isometric view of a shipping cartridge according to a preferred embodiment of this invention.
Figure 3:
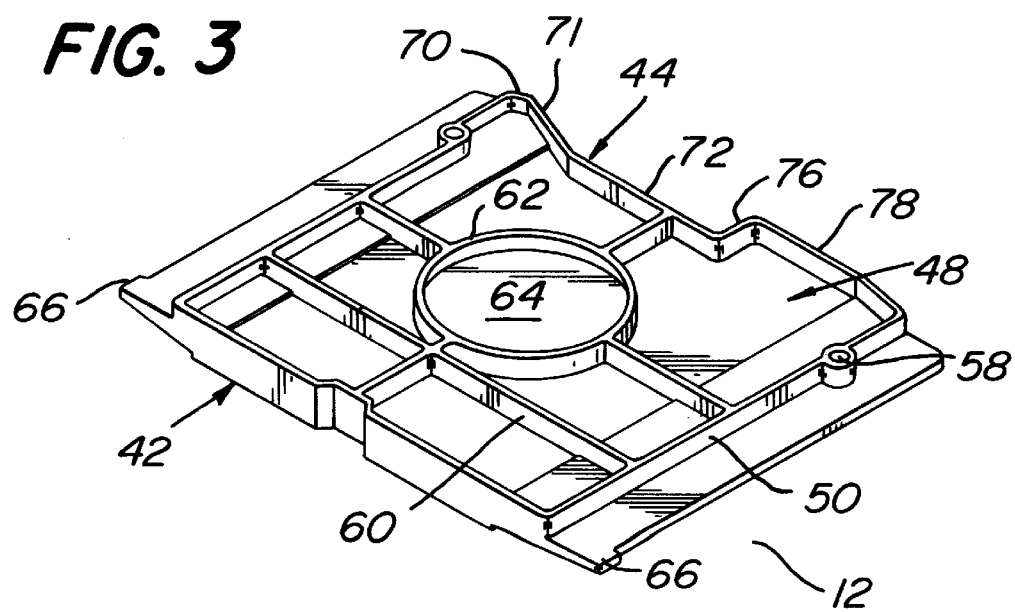
FIG. 3 is a bottom isometric view of the shipping cartridge of FIG. 2.

An internal portion of a disk drive 10 is illustrated in FIG. 1. The shipping cartridge 12 of this invention can be inserted into this disk drive 10 to either prevent or minimize the likelihood of damage to the disk drive 10. A preferred embodiment of this shipping cartridge 12 is depicted in FIGS. 2 and 3.

Figure 4:
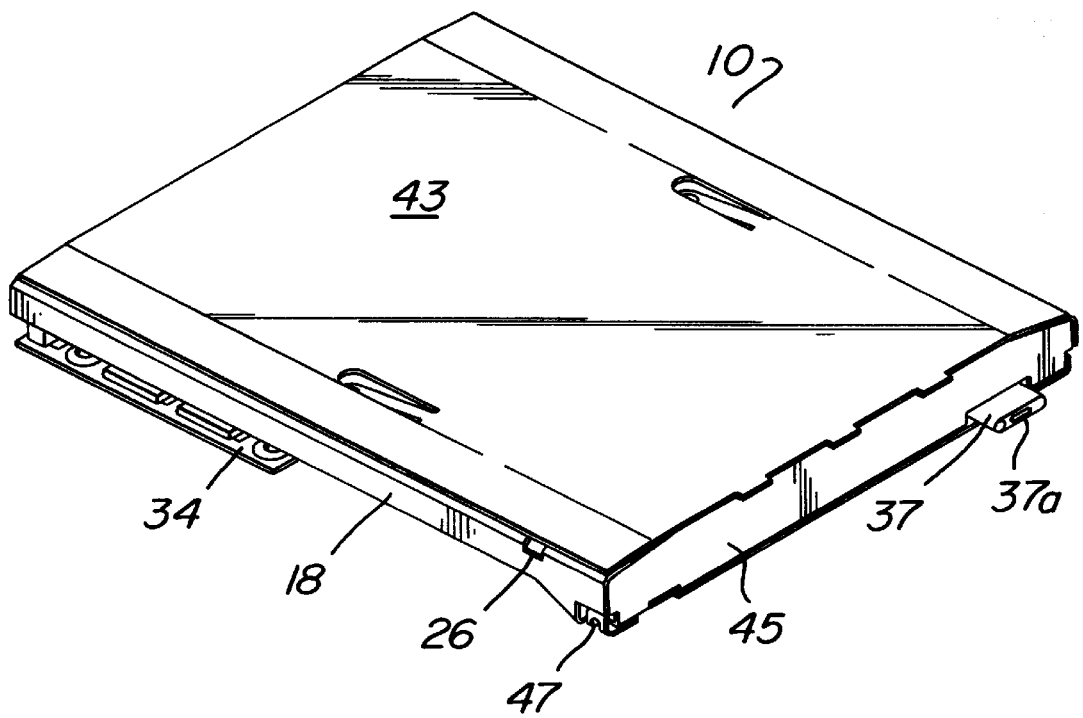
FIG. 4 is another isometric view of the disk drive of FIG. 1.

The disk drive 10 illustrated in FIGS. 1 and 4 are depicted in order to explain the operation of the shipping cartridge 12 of this invention. Although the disk drive 10 shown is of the type that may be embodied in a laptop type computer, the shipping cartridge 12 of this invention is not limited to use with the disk drive 10 shown. For example, it may be used with a "stand alone" type disk drive or a disk drive that is housed with a tray or bay and encased with a microprocessor in a typical office computer.

The shipping cartridge of this invention is intended to be placed in a disk drive when it is shipped and before it is installed in a tray or bay of a computer or housed in a casing.

Preferably, this occurs when the disk drive is being handled by an original equipment manufacturer (OEM). FIG. 4 illustrates a disk drive as it is typically handled by an OEM.

As shown, the disk drive 10 may have a chassis 14. The chassis 14 may have a lateral surface 16 and walls 18, 20 extending from the periphery of the lateral surface 16. The lateral surface 16 forms the support for the disk drive 10. When inserted into the disk drive 10, a disk cartridge (not shown) rests upon the lateral surface 16. The walls 18, 20 of the chassis 14 run longitudinally along the length of the disk drive 10. Attached to each of the walls 18, 20 may be a top rail 22. The top rail 22 preferably extends from the respective wall 18, 20 approximately parallel to the lateral surface 16 of the chassis 14. A groove 24 is formed between each wall 18, 20, the lateral surface 16 and the respective top rail 22. Disposed in the walls 18, 20 and the top rails 22 may be a notch 26.

As illustrated in FIG. 1, the chassis 14 may have a variety of features incorporated into it or attached to it that make the lateral surface 16 of the chassis 14 irregular, as opposed to a smooth flat surface. For instance, the chassis 14 may have at least one projection 28 extending above the lateral surface 16. The disk drive 10 may further include a variety of conventional features attached to the chassis 14, including, but not limited to, a disk drive actuator 30 that houses the heads 32 for interfacing with a disk cartridge, a circuit board 34 and a disk drive motor 36. The projecting features and attached features create the irregular surface as mentioned above. If the disk drive 10 is of the stand alone type or the type housed with a microprocessor in an office computer, a casing (not shown) may be disposed over the disk drive.

The disk drive may further include an eject system 38. The eject system 38 includes an eject lever 40 for ejecting a disk cartridge from the disk drive 10. The ejection system 38 may further include an eject button 37 disposed on the front of the disk drive 10. Attached to the eject button 37 may be a light pipe 37a. The eject lever 40, the eject button 37 and the light pipe 37a function to operate the eject system 38 and engage a disk cartridge to eject it from the disk drive 10. Operation of the eject system 38 and other features of this disk drive 10 are described in commonly assigned co-pending application, entitled An Improved Operating System For Operating An Eject System And A Head Retraction System Of A Disk Drive, U.S. patent application Ser. No. 08/866,189 filed on May 30, 1997, (Attorney docket number IOM-9460), which is herein incorporated by reference.

The disk drive 10 may also have a shutter lever 41 disposed on the chassis 14. Preferably, the shutter lever 41 is rotatably mounted to the chassis 14. The shutter lever 41 functions to push a shutter disposed on a disk cartridge to expose an opening in the disk cartridge through which the disk drive heads can communicate with the storage medium of the disk cartridge.

The disk drive motor 36, alluded to above, moves between an unloaded position and a loaded position to engage and disengage a disk cartridge when it is respectively inserted and ejected from the disk drive 10. Operation of this disk drive motor 36 is also described in the co-pending application incorporated above.

The disk drive 10 itself is not part of the invention described in this application. A description of the disk drive 10 is provided in order to clearly describe the shipping cartridge 12 of this invention. Moreover, the shipping cartridge 12 of this invention may be used with other disk drives, not merely the one described herein.

The disk drive 10 may have a top 43 attached to it. The top 43 may be attached to the disk drive 10 by spot welding it to the walls 18, 20 of the disk drive 10. The top 43 may also be relatively flexible and a relatively weak material. In some disk drives 10, the top 43 comprises sheet metal. Moreover, the top 43 may be relatively thin and in the disk drive 10 shown the top 43 has a thickness of about 7 thousandths of an inch.

Figure 5:
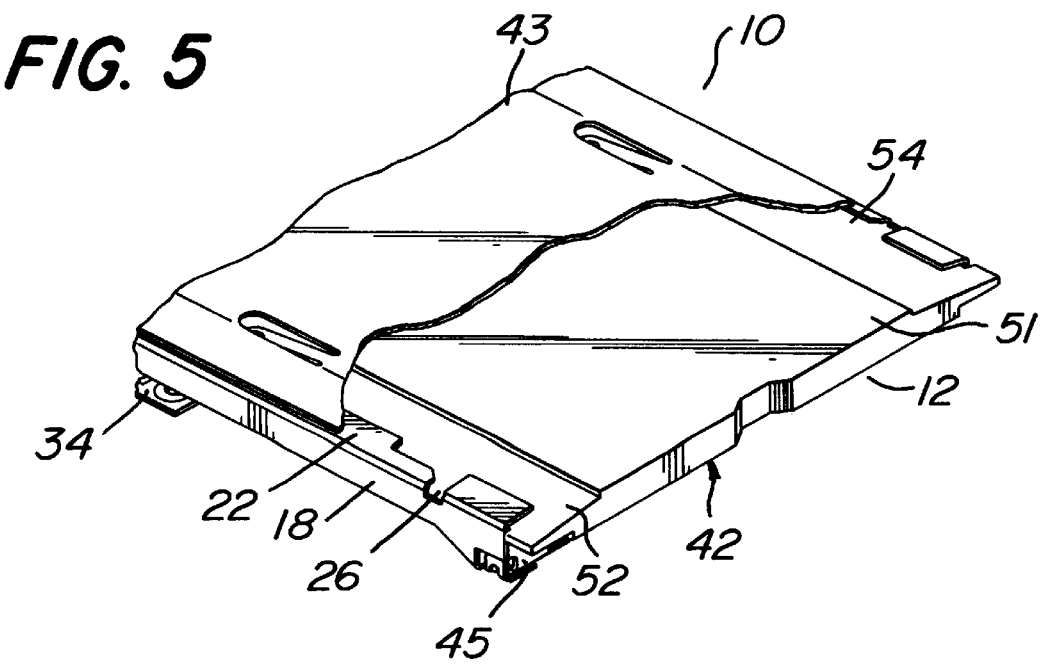
FIG. 5 is an isometric view of the preferred embodiment of this invention depicted in FIGS. 2 and 3 inserted into the disk drive of FIG. 1.

The disk drive 10 may also have a face plate 45 that is hinged to the disk drive. FIG. 1 illustrates an opening in the disk drive through which the face plate 45 may be hinged with pins 47 and springs to the disk drive 10. The face plate 45 may be spring loaded so that it springs into a closed position, as shown in FIG. 4. When the face plate 45 is pushed, it bends downward against spring pressure so that a disk cartridge or other apparatus can be inserted into the disk drive 10, as shown in FIG. 5.

As mentioned above, disk drives are typically shipped without a casing as shown in FIG. 4. When the disk drive is moved or shipped, dynamic forces potentially may be applied to the disk drive 10. Since many of the internal components of the disk drive 10, such as the disk drive motor 36, are relatively fragile, these dynamic forces have the potential to damage these components. Furthermore, static forces may be applied to the disk drive 10. Similar to the dynamic forces, the static forces have the potential to harm the components of the disk drive 10. In order to prevent or minimize the likelihood of harm to these components, the shipping cartridge 12 of this invention is provided. The term "shipping" is used in this application to signify any movement of the disk drive 10. For instance, shipping could refer to any movement or handling of a disk drive from a manufacturer to a distributor, movement by a party, such as movement by an original equipment manufacturer (OEM). The term "shipping" may also refer to a disk drive in a static state, such as when it is stowed. The term "shipping" as used in the phrase shipping cartridge may refer to any device inserted into the disk drive to prevent damage to the disk drive, even when the disk drive is not being moved.

A preferred embodiment of the shipping cartridge 12 for protecting the disk drive 10 during movement of the disk drive 10 is depicted in FIGS. 2 and 3 and includes a front 42, a back 44, a top surface 46 and a bottom surface 48. The top surface 46 is preferably relatively flat and smooth. In contrast, the bottom surface 48 has a plurality of rails 50 that conform to features of the disk drive 10 in order to protect these features from damage. When inserted into the disk drive as shown in FIG. 5, the front 42 of the shipping cartridge 12 is disposed proximal to the front of the disk drive 10 and the back 44 of the shipping cartridge 12 is disposed toward the rear of the disk drive 10.

The top surface 46 of the shipping cartridge 12 may include three sections, a raised section 51 and two lower sections 52, 54. The top surface 46 may also have a periphery 56 However, the top surface 46 may have a variety of configurations and is not limited to this design.

The bottom surface 48 may have a peripheral rail 50 extending along the outer periphery of the bottom surface 48. The peripheral rail 50 shown is continuous. Instead of a single continuous rail, the peripheral rail 50 may be discontinuous and have several sections along the periphery. The peripheral rail 50 forms the support structure for the shipping cartridge 12 and rests against the lateral surface 16 of the chassis 14 of the disk drive 10 when the shipping cartridge 12 is inserted into the disk drive 10. Because the peripheral rail 50 rests against the chassis 14, it must conform to the contour of the chassis 14. For instance, the chassis 14 has a hole in its lateral surface 16 through which a finger 28 projects. In order for the shipping 12 cartridge to rest smoothly on the chassis 14, the peripheral rail has an aperture 58 disposed in the rail 50 that can receive the finger 28. Of course, the shipping cartridge 12 need only have those features that conform it to the surface of the chassis 14. Therefore, if the chassis 14 does not have a finger or other projections extending from it, the shipping cartridge 12 may be manufactured without any apertures 58 in the rails 50. Conversely, if the disk drive 10 has multiple protrusions extending from the chassis 14, the shipping cartridge 12 may have a corresponding number of apertures 58 for receiving the protrusions.

Since the peripheral rails 50 rest on the lateral surface 16 of the chassis 14, a force or load placed on the shipping cartridge 12, will be transmitted through the top surface 46 of the shipping cartridge 12 to the peripheral rails 50 and ultimately to the lateral surface 16 of the chassis 14. This helps to protect the disk drive 10 because the shipping cartridge 12 absorbs the load. This also helps to protect the components disposed beneath the shipping cartridge 12, because forces that may scratch these components are protected from coming into direct contact with these components. For instance, if a sharp object contacts the shipping cartridge 12, it will be scratched as opposed to the lateral surface 16 of the chassis 14 or a component of the disk drive 10, such as the disk drive spindle motor 36.

The shipping cartridge 12 is inserted into the disk drive 10 similar to a disk cartridge. The bottom surface of the shipping cartridge 12 is aligned with the lateral surface 16 of the chassis 14, and the periphery 56 of the top surface 46 is aligned with the grooves 24. The shipping cartridge 12 is then slid into the disk drive 14 by pushing the hinged face plate 47 down, as shown in FIG. 5. Once inserted in the disk drive 10, the bottom surface 48 of the shipping cartridge 12 rest on the lateral surface 16 of the chassis 14, and the periphery 56 of the shipping cartridge 12 is disposed in the grooves 24.

The shipping cartridge 12 may further include a plurality of internal rails 60 that further run across the bottom surface 48 of the shipping cartridge 12. The rails 60 may extend from the portion of the peripheral rail 50 disposed on one side of the shipping cartridge 12 to the portion of the peripheral rail 50 disposed on the other side of the shipping cartridge 12. These internal rails 60 further support the shipping cartridge 12.

Since the internal rails 60 must also conform to the lateral surface 16 of the chassis 14, the internal rails 60 may further include a rail 62 that is circular in shape that conforms to the aperture 64 in the chassis 14 in which the disk drive spindle motor 36 is disposed. This enables the shipping cartridge 12 to cover the aperture 64 and rest smoothly on the lateral surface 16 of the chassis 14. When inserted into the disk drive, the shipping cartridge 12 covers the disk drive motor. By covering the disk drive motor 36, the shipping cartridge 12 protects it from damage.

The shipping cartridge 12 may further include a pair of tabs 66 that extend from the top surface 46 of the shipping cartridge 12. In a preferred embodiment of this invention, the tabs 66 extend about 6 mm. from the periphery 56 of the top surface 46 of the shipping cartridge 12. When the shipping cartridge 12 is inserted into the disk drive 10, the tabs 66 rest against the front of the disk drive 10. The tabs 66 do not extend into the disk drive 10. Rather, the width "L" of the shipping cartridge 12 is greater than the distance "d" of the disk drive 10, so that the shipping cartridge 12 rests against the front of the disk drive. Therefore, if a force, such as a dynamic shock or a static load, is applied to the tabs 66 or front 42 of the shipping cartridge 12, the force will be transmitted through the tabs 66 of the shipping cartridge 12 and through the walls 18 of the chassis 14. The load is thereby transmitted through the relatively sturdy chassis 14 and away from the less sturdy components of the disk drive 10, such as the actuator 30 and the disk drive motor 36. Since the chassis 14 is relatively sturdy in comparison to the other components of the disk drive 10, the load is transferred through it, as opposed to the more fragile components of the disk drive 10.

Once inserted into the disk drive 10, the shipping cartridge 12 helps in protecting the disk drive 10 and its components from damage. For instance, the disk drive 10 covers the lateral surface 16 of the chassis 14 and supports the top 43 of the disk drive 10. By supporting the top 43, the shipping cartridge 12 protects the top 43. For instance, if a static or dynamic force is applied to the disk drive 10, depending on its placement, it may be received by the top 43 of the disk drive 10 and transmitted through the top surface 46 of the shipping cartridge 12. This force will be transmitted through the bottom surface 48 and peripheral rails 50 to the chassis 14 and through the walls 18 of the chassis 14. Since the shipping cartridge 12 is relatively sturdy and the chassis 14 is relatively sturdy relative to other parts of the disk drive 10, the force is received and transmitted through the relatively strong parts of the chassis 14. This prevents forces from being applied directly to the unsupported top 43 of the disk drive 10. As described above, the top 43 of the disk drive 10 may be relatively weak, and therefore, it may be damaged if it was unsupported. Moreover, if the top 43 is damaged, the internal components of the disk drive 10, such as the disk drive motor 36 could be damaged. Thus, the shipping cartridge 12 supports the top 43 of the disk drive 10 and thereby protects the internal components of the disk drive 10.

In a preferred embodiment of this invention, the shipping cartridge 12 is manufactured through injection molding techniques. However, other conventional manufacturing techniques may be employed.

The shipping cartridge 12 is preferably constructed from plastic. Other materials, however, may be used provided that can withstand the loading applied to the cartridge.

As described above, when a disk cartridge is inserted into the disk drive 10, the disk drive motor 36 moves from an unloaded position to a loaded position. In order to minimize the likelihood of damage to the disk drive motor 36 during shipping, the shipping cartridge 12 may be designed to prevent the disk drive motor 36 from being engaged. The shipping cartridge 12 prevents movement of the disk drive motor 36 by preventing engagement of the eject lever 40. For instance, the back 44 of the shipping cartridge 12 may be designed to prevent engagement of the eject lever 40 and subsequent movement of the disk drive motor 36. In addition, the shipping cartridge 12 may also be designed to prevent movement of the shutter lever 41. The movement of the shutter lever 41 is prevented because when the shipping cartridge 12 is inserted into the disk drive 10, the shipping cartridge 12 engages the shutter lever 41 to rotate it and hold it a spring loaded position.

In this regard, the peripheral rail 50 disposed along the back 44 of the cartridge may have a first chamfered portion 70, a second chamfered portion 71 and a first flat portion 72.

The first flat portion 72 is disposed approximately transverse to the longitudinal axis of the shipping cartridge 12. In comparison, the first and the second chamfered portion 70, 71 are disposed at an angle relative to the first flat portion 72. The angle of the first chamfered portion 70 preferably conforms to the angle at which the angled portion 75 of the shutter lever 41 is disposed relative to a line transverse to the longitudinal axis of the disk drive 10. When a shipping cartridge 12 is inserted into the disk drive 10, the second chamfered portion 71 and the first flat portion 72 are disposed proximal to the eject lever 40. Because these portions of the shipping cartridge 12 are proximal to the eject lever 40, the shipping cartridge 12 prevents movement of the eject lever 40 when inserted into the disk drive 10. As a result, the disk drive motor 36 remains in the unloaded position. By preventing movement of the eject lever 40 during shipping, the shipping cartridge 12 helps to protect it and the other components linked to it from being damaged.

When the shipping cartridge is 12 is inserted into the disk drive 10, the second chamfered portion 71 contacts the shutter lever 41 and causes the shutter lever 41 to rotate against spring pressure. Once fully inserted into the disk drive, the shutter lever rests against the first flat portion 72 of the shipping cartridge 12 in a spring loaded position. By holding the shutter lever 41 in this position, the shutter lever 41 is protected from moving and being damaged while the disk drive 10 is shipped.

The peripheral rail 50 that runs along the back side 44 of the shipping cartridge 12 may also include rounded surface 76 and a second flat surface 78. The second flat surface 78 and the rounded surface 76 are disposed proximal to the disk drive actuator 30 when the shipping cartridge 12 is inserted into the disk drive 10.

The length "L" of the shipping cartridge 12 may be equal to or longer than the distance "d" of the disk drive 10, so that when the shipping cartridge is inserted into the disk drive 10, it extends to or past the front of the disk drive 10. By extending at least as far as the distance "d," the shipping cartridge covers the eject button 37 and the light pipe 37a, as shown in FIG. 5. Because the shipping cartridge 12 covers these components, the shipping cartridge 12 protects the eject button 37 and the light pipe 37a from damage. For instance, the shipping cartridge 12 helps to prevent loads from being applied to these components.

A preferred method of packaging a disk drive 10 for movement or shipping includes aligning the shipping cartridge 12 with a disk drive 10 and inserting the shipping cartridge 12 into the disk drive 10. Inserting the shipping cartridge 12 includes sliding the peripheral 50 and internal rails 60 onto the lateral surface 16 of the chassis 14. It also includes sliding the periphery 56 of the top surface 46 into the grooves 24 of the disk drive 10 and resting the tabs 66 against the front of the disk drive 10.

It is to be understood, however, that even in numerous characteristics and advantages of the present invention have been set forth in the foregoing description, together with details of the structure and function of the invention, the disclosure is illustrative only, and changes may be made to detail, especially in matters of shape, size and arrangement of parts within the principles of the invention to the fill extent indicated by the broad general meaning of the terms in which the appended claims are expressed.

What is claimed is:

1. A shipping cartridge for inserting into a disk drive of the type that has a chassis and a shutter lever, rotatable mounted to the chassis, for moving the shutter of a disk cartridge, the shipping cartridge being for protecting the disk drive during movement of the disk drive and, comprising:

a top surface;

a bottom surface; and a peripheral rail, disposed on the bottom surface, the peripheral rail having a bottom that conforms to a surface of the chassis and supports the shipping cartridge when it is inserted into the disk drive, and a chamfered portion that engages the shutter lever to rotate the shutter lever to a rotated position as the shipping cartridge is inserted into the disk drive and a first flat portion that holds the shutter lever in the rotated position when the shipping cartridge is fully inserted into the disk drive to prevent movement of the shutter lever and thereby damage the shutter lever during shipping.

2. The shipping cartridge of claim 1, wherein the disk drive in which the shipping cartridge can be inserted has an eject button extending from a front of the disk drive and wherein the shipping cartridge further comprises a front that has a width that is greater than a width of the front of the disk drive, so that when the shipping cartridge is inserted into the disk drive the front of the shipping cartridge extends from the front of the disk drive to cover the eject button and thereby protect the eject button from damage due to mechanical shock when moving the disk drive.

3. The shipping cartridge of claim 2, wherein the front comprises a first tab extending laterally from a first side of the front of the shipping cartridge and a second tab extending laterally from a second side of the front of the shipping cartridge, the first and the second tabs resting respectively against a first wall and a second wall of the chassis of the disk drive, when the shipping cartridge is inserted into the disk drive, so that when a force is applied to the front of the shipping cartridge the force will be transmitted through the front of the shipping cartridge and the walls of the disk drive.

4. The shipping cartridge of claim 1, wherein the shipping cartridge is manufactured by injection molding.

5. The shipping cartridge of claim 1, wherein the shipping cartridge comprises plastic.

6. The shipping cartridge of claim 1, further comprising an internal rail disposed on the bottom surface of the shipping cartridge.

7. The shipping cartridge of claim 6, wherein the internal rail is formed in a circle to form an aperture for covering a disk cartridge motor disposed in the chassis.

8. The shipping cartridge of claim 1, where in the disk drive has a top and the shipping cartridge supports the top when it is inserted into the disk drive.

9. The shipping cartridge of claim 1, wherein the peripheral rail forms an aperture for receiving a protrusion extending above the surface of the chassis.

10. A shipping cartridge for inserting into a disk drive to minimize the likelihood of damage to the disk drive during movement of the disk drive, the disk drive having a chassis that has a lateral surface and a wall that extends from the lateral surface and an eject button extending from a front of the disk drive, the shipping cartridge comprising:

a top surface having a periphery;

a bottom surface that rests on the lateral surface of the chassis when the shipping cartridge is inserted into the disk drive; and a front that has a width that is greater than a width of the front of the disk drive so that when the shipping cartridge is inserted into the disk drive the front of the shipping cartridge extends from the front of the disk drive to cover the eject button and thereby protect the eject button from damage due to mechanical shock when moving the disk drive.

11. The shipping cartridge of claim 10, wherein the shipping cartridge is manufactured by injection molding.

12. The shipping cartridge of claim 10, wherein the shipping cartridge comprises plastic.

13. The shipping cartridge of claim 10, further comprising a peripheral rail, disposed on the bottom surface, that conforms to the lateral surface of the chassis and rests on the lateral surface of the chassis when the shipping cartridge is inserted into the disk drive.

14. The shipping cartridge of claim 13, wherein the peripheral rail forms an aperture for receiving a protrusion extending above the lateral surface of the chassis.

15. The shipping cartridge of claim 10, wherein the disk drive has a shutter lever rotatable mounted to the chassis and wherein the shipping cartridge further comprises peripheral rail extending from the bottom of the shipping cartridge that has a first chamfered portion that engages the shutter lever to rotate the shutter lever to a rotated position as the shipping cartridge is inserted into the disk drive and a first flat portion that holds the shutter lever in the rotated position when the shipping cartridge is fully inserted into the disk drive to prevent movement of the shutter lever and thereby damage the shutter lever during shipping.

16. The shipping cartridge of claim 10, further comprising internal rails that are formed in a circle to form an aperture for covering a disk cartridge motor disposed in the lateral surface of the chassis.

17. A shipping cartridge for inserting into a disk drive to protect the disk drive during movement of the disk drive, the disk drive having a chassis, a top disposed over the chassis and an eject lever rotatable mounted to the chassis, the shipping cartridge comprising:

a top surface having a periphery for supporting the top of the disk drive when the shipping cartridge is inserted into the disk drive;

a bottom surface; and a rail, disposed on the bottom surface, that conforms to the lateral surface of the chassis and rests on the lateral surface of the chassis when the shipping cartridge is inserted into the disk drive and that has a portion that rests proximal to the eject lever when the shipping cartridge is inserted into the disk drive to prevent the eject lever from moving during movement of the disk drive and thereby preventing the eject lever from being damaged.

18. The shipping cartridge of claim 17, wherein the disk drive has a shutter lever rotatably mounted to the chassis and wherein the shipping cartridge further comprises peripheral rail extending from the bottom of the shipping cartridge that has a first chamfered portion that engages the shutter lever to rotate the shutter lever to a rotated position as the shipping cartridge is inserted into the disk drive and a first flat portion that holds the shutter lever in the rotated position when the shipping cartridge is fully inserted into the disk drive to prevent movement of the shutter lever and thereby damage the shutter lever during shipping.

19. The shipping cartridge of claim 17, wherein the disk drive in which the shipping cartridge can be inserted has an eject button extending from a front of the disk drive and wherein the shipping cartridge further comprises a front that has a width that is greater than a width of the front of the disk drive, so that when the shipping cartridge is inserted into the disk drive the front of the shipping cartridge extends from the front of the disk drive to cover the eject button and thereby protect the eject button from damage due to mechanical shock when moving the disk drive.

20. The shipping cartridge of claim 19, wherein the front comprises a first tab extending laterally from a first side of the front of the shipping cartridge and a second tab extending laterally from a second side of the front of the shipping cartridge, the first and the second tabs resting respectively against a first wall and a second wall of the chassis of the disk drive, when the shipping cartridge is inserted into the disk drive, so that when a force is applied to the front of the shipping cartridge, the force will be transmitted through the front of the shipping cartridge and the walls of the disk drive.

21. A method of packaging a disk drive, comprising:

providing a disk drive, comprising
(i) a chassis that has a lateral surface;
(ii) a first wall extending from the lateral surface;
(iii) a first top rail extending from the first wall to form a groove between the first wall, the first top and the lateral surface;
(iv) a top attached to the first top rail that covers the chassis;
(v) an eject button extending from a front of the chassis;
(vi) a shutter lever rotatably mounted to the chassis; and inserting a shipping cartridge into the disk drive by sliding rails extending from a bottom of the shipping cartridge onto the lateral surface of the chassis, sliding the shipping cartridge under the top of the disk drive and sliding a periphery of the shipping cartridge into the groove of the disk drive, further sliding the shipping cartridge into the disk drive until a chamfered portion of the rail extending from the bottom of the shipping cartridge contacts the shutter lever to rotate the shutter lever, further inserting the shipping cartridge into the disk drive to move the shutter lever to a rotated position to prevent the shutter lever from moving and being damaged, and continuing to insert the shipping cartridge until further insertion of the shipping cartridge is prevented by a fist tab extending from first side of a front of the shipping cartridge and a second tab extending from a second side of a front of the shipping cartridge respectively contact the first wall and a second wall of the chassis, the front of the shipping cartridge extending from the disk drive when the first and the second tab respectively contact the first and the second wall, so that the front of the shipping cartridge covers the eject button to prevent the eject button from damage during movement of the disk drive.

* * * * *